3,058,836
MODIFIED ACID CASEIN AND ADHESIVE DERIVED THEREFROM

Julius Sirota, South Plainfield, N.J., assignor to National Starch and Chemical Corporation, New York, N.Y., a corporation of Delaware
No Drawing. Filed Oct. 23, 1959, Ser. No. 848,195
19 Claims. (Cl. 106—146)

This invention relates to a method for making a modified acid-precipitated casein, the modified casein produced therefrom, and an adhesive composition derived from the modified acid casein.

One of the principal uses of acid casein is as a base for adhesive for labeling bottles, of the type which are subsequently subjected to prolonged contact with ice or cold water, as for example, bottles containing carbonated beverages, beer and the like. Such adhesives are often referred to as "ice proof bottle labeling adhesives." Ice proof bottle labeling adhesives have heretofore been made from acid-precipitated casein (i.e., casein produced by precipitation with hydrochloric, lactic or other acid). For purposes of brevity I shall hereinafter refer to this as "acid casein." In the adhesive art, when one speaks of "casein" it is this acid casein which is ordinarily referred to. In formulating adhesives from such casein, the procedure has commonly been to disperse the casein in water by the use of sodium hydroxide, together with the addition of urea and a zinc salt. The urea serves as a peptizer to keep the casein in fluid form for relatively long periods, allowing for adhesives of long pot life, and the zinc salt imparts water resistance to the ultimate adhesive film. Other additives, such as borax, ammonia and various salts are also sometimes used in order to achieve particular properties. Very small amounts of alkaline earth compounds, such as those of calcium or barium, are also sometimes used to achieve improved viscosity, stability and machinability. However, it has heretofore been impossible to employ such alkaline earth compounds in any substantial proportions with long-life acid casein adhesives, since these compounds when present in substantial quantity cause a rapid thickening of the adhesive to a useless mass. Thus, the actual mixture of casein and lime has only been employed in the so-called "quick-setting" adhesives, which must be used immediately after mixing.

Another disadvantage of the hitherto used acid casein bottle labeling adhesives has been their inherently poor reproducibility. It has been quite impossible to reproduce batches substantially uniform in viscosity, stability and machinability from a given formula, without making expensive and time-consuming adjustments upon each batch. This inconsistency in properties is due to the inherent nature of the acid casein itself. Casein, liberated as free acid during its manufacture, varies from batch to batch, depending upon its source and the conditions of its manufacture. A given batch of casein will change with age, depending upon temperature, pH and moisture conditions. The change in the casein includes a loss in solubility, loss in crystallinity, changed absorption spectrum, increased sulfhydryl group content and changed solution viscosity; said changes being accentuated by the heat and peptizers required in the formulation of ice proof bottle labeling adhesives. The changes appear to be irreversible, and deleteriously affect the properties of the ultimate adhesive.

It is an object of this invention to provide a modified casein having uniformity from batch to batch regarding properties such as solubility, crystallinity, absorption spectrum, sulfhydryl group content and solution viscosity. It is a further object to provide an adhesive using a modified acid casein base with improved properties of viscosity, water resistance, machinability and sensibility. Still another object is to provide a modified casein which will assure that a given formula using said casein will be reproducible in a uniform and predictable manner, so as to consistently obtain an adhesive having the desired characteristics. Other advantages will become aware to those skilled in the art as the description of this invention unfolds.

I have now discovered that the acid-precipitated casein may be chemically modified so as to achieve substantial improvement in the aforementioned properties. This is accomplished by reacting the acid casein with an alkaline earth hydroxide, preferably calcium hydroxide, and then neutralizing by adding phosphoric acid to the resultant reaction product.

By means of this treatment I have produced a modified acid casein characterized by a notably improved degree of water resistance, batch-to-batch uniformity, machinability and decreased viscosity, as contrasted to the unmodified acid casein from which it is derived. Because of these improved properties in the casein itself, I am now able to produce casein bottle labeling adhesives devoid of the previously described disadvantages.

I shall now describe in greater detail the method for modifying the acid casein. The preferred method is to disperse the casein in water, to form a dispersion containing from 15% to 30% of acid casein by weight of $H_2O$; this is followed by the addition, with agitation, of from 2% to 20% of alkaline earth hydroxide, based on the weight of the casein solids. Phosphoric acid is then added to the casein-hydroxide reaction mass to reduce the pH to a value of approximately 5–9, the preferred range being 7–8.

It is believed that the improved properties of the thus modified acid casein result from the formation of calcium phosphate "in situ." It is critical that the $Ca_3(PO_4)_2$ be so generated, for the mere direct addition of equivalent quantities of calcium phosphate to acid-casein yields a product with very poor properties. Similarly, acid-casein-calcium hydroxide systems which are neutralized with acids other than phosphoric, as for example, hydrochloric, sulfuric or acetic acids, do not yield products with the excellent water resistance of the acid casein-calcium hydroxide-phosphoric acid reaction product. Furthermore, it is essential that the phosphoric acid be added to the casein alkaline earth mass. The converse is not acceptable.

As an alternative, one may begin as above by dispersing the acid casein in water, adding the alkaline earth hydroxide, and then solubilizing this reaction product by the addition of a non-alkaline peptizer such as urea, formamide, thiourea, ammonium thiocyanate, acetamide or dicyandiamide. Neutralization with the phosphoric acid then follows. In general, however, I prefer to withhold the solubilization until the casein product is actually to be employed in an adhesive or other formulation.

It has already been pointed out that the use of calcium hydroxide and other alkaline earth compounds has been proposed, in the past, to achieve particular properties in casein adhesives. However, it has been impossible to use such alkaline earths in any substantial quantities without thickening the casein composition to an unworkable mass. My invention, on the other hand, makes it possible to use substantial quantities of these alkaline earth compounds as part of a process which, in combination with the phosphoric acid neutralization, results in a modified acid casein product whose performance and properties go far beyond the relatively slight degree of improvement obtainable by prior art methods.

Excellent solutions of the modified acid casein may be obtained by the use of the so-called non-alkaline peptizer type compounds, such as urea, ammonium thiocyanate, formamide, acetamide, thiourea, and dicyandiamide. The modified acid casein in the form of its alkaline earth salt is more stable than the unmodified casein for any given lot against deterioration in properties upon aging, since the carboxyl groups (which are present in the unmodified acid casein) are blocked off from reacting. Furthermore, the modified acid casein is already in the form of a natural, relatively insoluble alkaline earth salt, which in the case of the ordinary unmodified acid casein must be manufactured by manipulation with zinc salts, and the like. Thus, the complications involved in insolubilizing conventional acid casein solutions with various metallic salt complexes are avoided or minimized.

With regard to the particular alkaline earth hydroxides which may be used for the reaction with the aqueous acid casein dispersion, I have already indicated the preference for calcium hydroxide. However, the practitioner will find that other alkaline earth hydroxides including barium, strontium and magnesium hydroxide are also applicable for many formulations. Therefore, any reference, in this specification, to the use of calcium hydroxide should be understood to include also the use of the other alkaline earth hydroxides.

The mechanics of formulating adhesives from my modified acid casein are as follows. When the peptizer is not added prior to neutralization, the modified acid casein is added to an aqueous solution of a non-alkaline peptizer type of solubilizer (e.g. urea, ammonium, thiocyanate, etc.). The method wherein the peptizer is added prior to neutralization has been previously described. In both instances, in order to speed the solution of the casein (modified or unmodified), a minimum amount of heat is applied, preferably between 70° F. and 150° F. Excessive heating is inadvisable, although even in this respect my modified acid casein is superior to the old untreated acid precipitated casein, since the latter would deteriorate much more quickly with heat. Other materials may be added, as desired, to achieve specific properties. For example, clays, flours, meals or other fillers may be added in order to give the adhesive a desired "body"; also a preservative such as phenol may be added to avoid spoilage upon standing.

As previously stated, my modified acid casein, being a relatively insoluble alkaline earth salt of casein, does not require treatment with metallic ions (such as zinc) in order to achieve proper water resistance and other desired properties. However, the use of such chemicals as additives is, of course, not precluded, and may sometimes be found desirable in order to yield specifically desired properties. Thus, if one is to adhere metal foil labels (instead of paper labels) to glass, the presence of a small amount of zinc or copper salt in the adhesive (approximately ¼ to 3%, based on the casein solids) tends to improve the adhesion of such labels under conditions of exposure to water. Zinc oxide or copper chloride are examples of such additives. The possibility of other additives will be apparent to the person skilled in the art, but in all cases the adhesive made with my modified acid casein is remarkably superior to that made with the hitherto used untreated acid precipitated casein.

The notable difference in water resistance, as between the acid precipitated casein of the prior art and the modified acid casein of my invention, is easily demonstrated by preparing aqueous solutions of each of these casein types, using urea as the peptizer (solubilizing agent). When films of each of the solutions are cast on glass, dried, and then immersed in water, it is found that the film of acid precipitated casein disintegrates within a few hours, whereas the modified casein film remains tenacious and adherent to the glass even after soaking overnight. Similarly, when paper labels are coated with these solutions and adhered to glass bottles, and the bottles immersed in water, the labels adhered with the unmodified acid precipitated casein come off in a few hours, whereas labels adhered with the modified casein remain firmly bonded to the glass after days and even weeks of soaking.

Because of the simplicity of the formulas, and the inherent stability of my modified acid casein, a given formula may be reproduced batch after batch, using a given lot of modified acid casein, with the assurance of obtaining the same properties, and without the need for slow and expensive adjustment of each batch—a factor of utmost importance in industrial practice.

It is thought that when the acid casein is treated with an alkaline earth, in the manner already described, there occurs a partial hydrolysis or breaking down of the casein molecules to produce a casein mass of more uniform chain lengths. This uniformity of chain lengths provides a material having less variability in the above referred to properties.

With reference to proportions, the practitioner will, of course, be able to adjust the quantities of the various materials to meet specific operating requirements. Since the art of making casein bottle label adhesives is known, and the essence of this invention is the preparation of modified acid casein and its use as the base of such adhesives, the practitioner obviously will have great latitude as to other ingredients and proportions, within the scope of this invention. In general, I have found that a desirable ice proof bottle label adhesive should contain approximately from 15% to 25% modified acid casein solids, by weight, and from 60 to 170% based on the weight of the modified acid casein, of the peptizer dispersing agent (urea, ammonium thiocyanate, etc.). Ordinarily, from 0.1 to 0.5% of preservative (based on the total composition) is sufficient, and in some cases, where metallic salts such as zinc or copper are present, preservative may not be needed. The amount of water in the formulation is ordinarily from 30% to 70%, by weight of the total composition.

When I refer herein to a non-alkaline peptizer dispersing agent, I refer to those essentially neutral or acid salts which have the property of causing casein to disperse in water (as contrasted to the alkaline solubilizers such as sodium hydroxide, lime, and the like). Examples of non-alkaline peptizer dispersing agents suitable for use in my invention are ammonium thiocyanate and the organic amides, including urea, formamide, thiourea, acetamide, dimethyl formamide and dicyandiamide. Ammonium thiocyanate, although not technically an organic amide, is an equivalent thereof for the purposes of this invention.

One of the problems in making bottle label adhesives employing dispersions of acid precipitated casein in water, with urea, has been that the heat applied during the step of dispersing the casein tended to break down the urea to form ammonia, which in turn raised the pH of the composition and resulted in a viscosity increase and a deterioration in water resistance of the adhesive. As already pointed out, my modified acid casein is far more resistant to this deterioration in properties upon heating. However, even this minimized degree of deterioration can be overcome, I have found, by the incorporation within the adhesive dispersion of additional phosphoric acid (in addition to that which has already been used in the neutralization of the acid-casein-calcium hydroxide reaction mixture), the amount used being sufficient to obtain the desired pH in the final composition this ordinarily being within the pH range 5–9. Surprisingly, I have found that the incorporation of this additional phosphoric acid also improves the rheological properties of the adhesive, giving it better spreading characteristics, improved "slip" and clearer films.

Another additive which I have found to be of particular value in acid modified casein formulations is oxalic acid. Lot to lot variations in the acid precipitated casein used for making the modified acid casein adhesives of my invention, such variations being associated with differing ash or calcium content, may be overcome by the addition of small amounts of oxalic acid (up to 0.5% based on the weight of the total composition). This is a simple method for adjusting a high viscosity modified acid casein lot to that of a standard viscosity lot. Although it is possible to lower the viscosity of a high viscosity lot of my modified acid casein by the use of additional peptizer, such as urea or ammonium thiocyanate, this may cause undesirable changes in the rheological properties of the adhesive. Oxalic acid, which acts by removing controlled amounts of calcium and its associated salt linkages from the composition, achieves reduction in viscosity without impairing the rheological properties. This action is unique with my modified acid casein, and does not take place with untreated acid precipitated casein products.

Returning now to the prime phase of my invention, namely the modification of acid casein, the following table lists a number of preparations illustrating the ingredients used (in varying proportions) for modifying the acid casein. All figures refer to parts by weight.

TABLE I

*Modification of Acid Casein*

|  | Prep. #1 | Prep. #2 | Prep. #3 | Prep. #4 | Prep. #5 |
|---|---|---|---|---|---|
| Water | 85.0 | 65.0 | 70.0 | 80.0 | 80.0 |
| Acid casein | 15.0 | 15.0 | 30.0 | 20.0 | 20.0 |
| $Ca(OH)_2$ | 0.3 | 3.0 | 0.6 | 2.0 | 1.0 |
| $H_3PO_4$ (25% aq. sol.) | 0.6 | 12.0 | 1.2 | 4.0 | 2.0 |

The procedure in compounding the above preparations involved, first, the mixture, with agitation, of the requisite amounts of water and casein for about 5 minutes. The calcium hydroxide was then added, agitation being continued for another 5 minutes, during which the time the pH of the mixture rose beyond 11, some ammonia was evolved, and the mass began to thicken. Thereupon, the phosphoric acid solution was introduced, with agitation, resulting in the neutralization of the reaction mass and a drop in its pH to the value indicated. In each case, the final product was a modified acid casein, with the improved properties already described.

In two further repetitions of the experiments, enough phosphoric acid was added to bring the pH to 5, in one series, and to 9, in another series, the results in both series being comparable to those described above.

The above experiments were repeated, except that in place of the preferred calcium compound, I used barium, strontium and magnesium hydroxides, respectively. Comparable products resulted.

In order to illustrate the preparation of actual adhesive compositions, based on my modified acid casein, a number of such compositions were made, using the modified acid casein referred to above as Prep. #5. In the following Table II, which lists these compositions, all figures refer to parts by weight, except the last line where pH values of the final compositions are given.

TABLE II

*Adhesive Compositions Made With Modified Acid Casein*

| Ingredients | Compositions | | | | | | | |
|---|---|---|---|---|---|---|---|---|
|  | I | II | III | IV | V | VI | VII | VIII |
| Modified acid casein solids | 25.0 | 15.0 | 23.0 | 23.0 | 23.0 | 22.0 | 21.5 | 21.5 |
| Urea | ----- | 25.0 | 23.0 | 23.0 | 23.0 | 24.5 | 24.0 | 24.0 |
| Ammonium Thiocyanate | 15.0 | ----- | ----- | ----- | ----- | ----- | 2.0 | 2.0 |
| Bentonite | 3.0 | 3.0 | 3.0 | 3.0 | 1.5 | 1.5 | 2.0 | 2.0 |
| Tapioca Starch | ----- | ----- | ----- | ----- | ----- | ----- | 0.4 | 0.4 |
| Zinc oxide | ----- | ----- | ----- | ----- | ----- | 0.5 | ----- | ----- |
| Copper Chloride | ----- | ----- | ----- | ----- | 0.5 | ----- | ----- | ----- |
| 75% Phosphoric Acid | ----- | ----- | ----- | 0.2 | 0.2 | ----- | 0.2 | 0.1 |
| Preservative | 0.5 | 0.5 | 0.5 | 0.5 | 0.3 | 0.3 | 0.5 | 0.5 |
| Oxalic Acid | ----- | ----- | ----- | ----- | ----- | ----- | ----- | 0.4 |
| Water | 56.5 | 56.5 | 50.5 | 50.3 | 51.5 | 51.0 | 49.4 | 49.1 |
| pH | 5.5 | 8.0 | 7.8 | 7.1 | 6.5 | 9.0 | 8.0 | 8.0 |

In compounding the above formulations, the procedure was to put the water into a vessel equipped with agitation; mix in (if called for, and in the order named) the bentonite, zinc oxide or copper chloride, starch, phosphoric acid, urea or ammonium thiocyanate; mix in the modified acid casein and agitate for 15 minutes; raise temperature to approximately 130° F. and discontinue heating, agitate 2 hours, add preservative and stir an additional ½ hour; add oxalic acid where called for; draw into drums.

In all cases, the final product was a liquid adhesive composition which was notably stable even after prolonged storage, and which, when used for applying labels to bottles, was characterized by excellent machinability, strong adhesion and resistance to prolonged contact with cold water. Similarly improved compositions were obtained when using as the base Preparations #1, 2, 3 and 4, respectively, of Table I.

Many variations are possible in the operation of this invention. Thus, for example, after treating the aqueous dispersion of acid precipitated casein with an alkaline earth hydroxide and phosphoric acid, the modified casein product may be filtered and dried, to be redispersed when desired, with the aid of a casein peptizer such as urea. Other variations in materials, proportions and procedures will be apparent to the practitioner in the art, without departing from the scope of the invention, which is limited only by the following claims.

I claim:
1. The method of modifying acid casein which consists essentially in reacting acid casein and an alkaline earth hydroxide in an aqueous medium, said acid casein being present in an amount from 15 to 30 percent by weight of water and said alkaline earth hydroxide being present in an amount from 2 to 20 percent based on the weight of the casein solids, and then adding sufficient phosphoric acid to the reaction mass to give a pH of 5–9.

2. The method for modifying acid casein which consists essentially in dispersing acid precipitated casein in water, mixing an alkaline earth hydroxide with said dispersion, said acid casein being present in an amount from 15 to 30 percent by weight of water and said alkaline earth hydroxide being present in an amount from 2 to 20 percent based on the weight of the casein solids, and then adding sufficient phosphoric acid to the reaction mass to give a pH of 5–9.

3. The method of claim 2 in which the alkaline earth hydroxide is calcium hydroxide.

4. The method of claim 2 in which the amount of phosphoric acid is sufficient to bring the reaction mass to a pH of approximately 7.

5. The method for preparing modified acid casein adhesive base which consists essentially in dispersing acid precipitated casein in water, mixing an alkaline earth hydroxide with said dispersion, said acid casein being present in an amount from 15 to 30 percent by weight of water and said alkaline earth hydroxide being present in an amount from 2 to 20 percent based on the weight of the casein solids, adding a non-alkaline peptizer for casein in order to solubilize the casein-alkaline earth hydroxide reaction product, and then adding sufficient phosphoric acid to the mass to give a pH of 5–9.

6. The method for preparing a modified acid casein adhesive base which consists essentially in dispersing acid precipitated casein in water, mixing an alkaline earth hydroxide with said dispersion, said acid casein being present in an amount from 15 to 30 percent by weight of water and said alkaline earth hydroxide being present in an amount from 2 to 20 percent based on the weight of the casein solids, adding sufficient phosphoric acid to the reaction mass to give a pH of 5–9 and then adding a non-alkaline peptizer for casein in order to solubilize the reaction mass.

7. The method of claim 5 in which the non-alkaline peptizer is selected from the group consisting of urea, formamide, thiourea, ammonium thiocyanate, acetamide and dicyandiamide.

8. The method of claim 6 in which the non-alkaline peptizer is selected from the group consisting of urea, formamide, thiourea, ammonium thiocyanate, acetamide and dicyandiamide.

9. The method for making bottle label adhesive compositions consisting essentially of dispersing acid casein in water, mixing an alkaline earth hydroxide with said dispersion, said acid casein being present in an amount from 15 to 30 percent by weight of water and said alkaline earth hydroxide being present in an amount from 2 to 20 percent based on the weight of the casein solids, reducing the pH of said mixture to from 5 to 9 by adding phosphoric acid and adding a non-alkaline peptizer for casein in order to solubilize the casein-alkaline earth hydroxide-phosphoric acid mass.

10. The method for making bottle label adhesive compositions consisting essentially of making an aqueous dispersion of a modified casein, said modified casein resulting from the reaction in an aqueous medium of acid precipitated casein and an alkaline earth hydroxide, said acid casein being present in an amount from 15 to 30 percent by weight of water and said alkaline earth hydroxide being present in an amount from 2 to 20 percent based on the weight of the casein solids, and the neutralization of said reaction product with phosphoric acid to a pH of 5–9, and adding a non-alkaline peptizer for casein to said aqueous dispersion in order to solubilize the modified casein.

11. The method of claim 10 in which the non-alkaline peptizer is selected from the group consisting of urea, formamide, thiourea, ammonium thiocyanate, acetamide and dicyandiamide.

12. The method of claim 9 in which oxalic acid is added in order to adjust the viscosity of the adhesive composition to the desired level.

13. The method of claim 10 in which oxalic acid is added in order to adjust the viscosity of the adhesive composition to the desired level.

14. The modified acid precipitated casein of claim 15 in which the alkaline earth hydroxide is calcium hydroxide.

15. A modified acid precipitated casein consisting essentially of the reaction product of an acid precipitated casein-alkaline earth hydroxide reaction product (said casein-alkaline earth hydroxide reaction product being formed by reacting in an aqueous medium a mixture consisting essentially of from 15 to 30 percent acid casein by weight of water and from 2 to 20 percent of alkaline earth hydroxide based on the weight of casein solids), and subsequently added phosphoric acid, said modified casein having a pH of 5–9.

16. The modified acid precipitated casein of claim 15 wherein the pH is approximately 7.

17. The modified acid precipitated casein of claim 15 wherein there is present in the modified casein reaction product a non-alkaline peptizer for casein.

18. A bottle label adhesive composition consisting essentially of the aqueous reaction product of an acid precipitated casein-alkaline earth hydroxide reaction product (said casein-alkaline earth hydroxide reaction product being formed by reacting in an aqueous medium a mixture consisting essentially of from 15 to 30 percent acid casein by weight of water and from 2 to 20 percent of alkaline earth hydroxide based on the weight of casein solids), and subsequently added phosphoric acid, said aqueous reaction product having a pH of 5–9.

19. The adhesive composition of claim 18 wherein there is added a non-alkaline peptizer for casein.

References Cited in the file of this patent

UNITED STATES PATENTS

| | | |
|---|---|---|
| 2,064,387 | Schwartz | Dec. 15, 1936 |
| 2,559,848 | Caldwell | July 10, 1951 |
| 2,570,561 | Kinney | Oct. 9, 1951 |
| 2,613,155 | White | Oct. 7, 1952 |
| 2,716,612 | Marks et al. | Aug. 30, 1955 |
| 2,810,655 | Dean | Oct. 22, 1957 |